D. HUNTER.
CLUTCH FOR PAPER ROLLS.
APPLICATION FILED FEB. 6, 1911.
999,191.
Patented July 25, 1911.
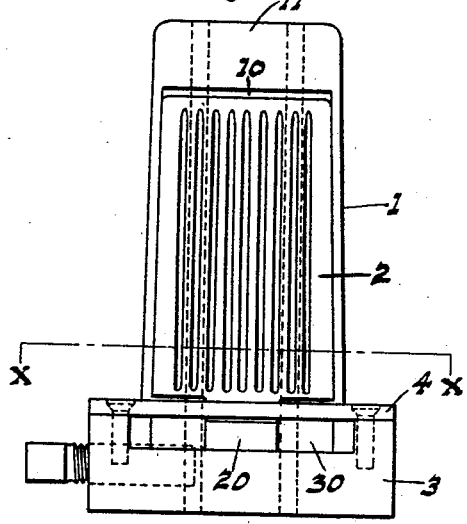
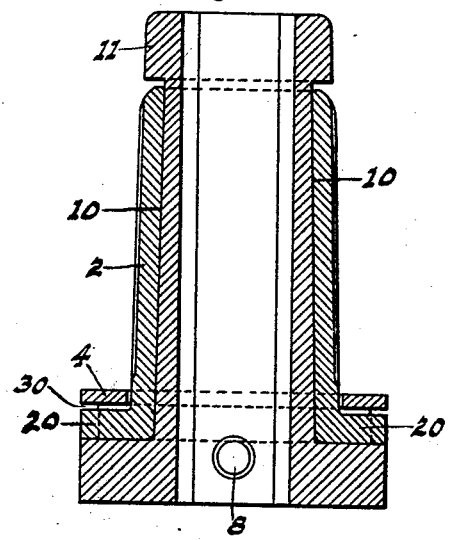
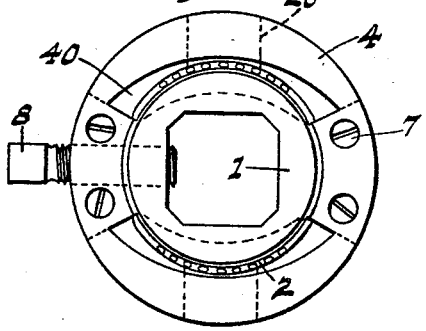
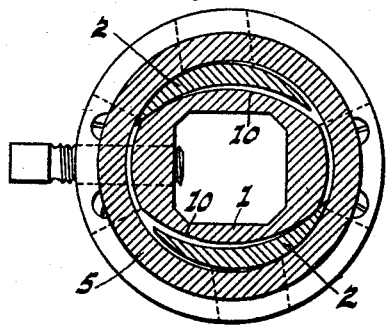
WITNESSES
INVENTOR
David Hunter
BY Henry L. Reynolds
ATTORNEY

UNITED STATES PATENT OFFICE.

DAVID HUNTER, OF SEATTLE, WASHINGTON.

CLUTCH FOR PAPER-ROLLS.

999,191. Specification of Letters Patent. Patented July 25, 1911.

Application filed February 6, 1911. Serial No. 606,995.

*To all whom it may concern:*

Be it known that I, DAVID HUNTER, a citizen of the United States, and resident of the city of Seattle, in the county of King and State of Washington, have invented certain new and useful Improvements in Clutches for Paper-Rolls, of which the following is a specification.

My invention relates to expansible mandrels or clutches, and particularly to an expansible mandrel or clutch for holding paper rolls in printing presses.

The object of my invention is, in general, to improve and simplify such devices, and in particular to make them stronger and less liable to breakage, and so that it will work to hold the roll against turning in either direction, thereby avoiding the necessity of having to have them both right and left handed.

My invention comprises the novel parts and combinations of parts which will be hereinafter described and particularly pointed out in the claims.

In the accompanying drawings I have shown my invention in the form which is now preferred by me, but not the only specific form in which it may be made.

Figure 1 is a side view or elevation of the mandrel or clutch. Fig. 2 is a longitudinal section of the same. Fig. 3 is an end view of the device. Fig. 4 is a cross section upon the line X, X, of Fig. 1.

My invention is intended for insertion within the ends of the core upon which rolls of paper are formed when intended for use upon printing presses, whereby the roll may be controlled in the tension of its web while being used up. As it is quite common to have the shaft upon which the roll is mounted, squared near the ends where the chunk is placed, I have shown the device as adapted for application to such a shaft, the hole being square with corners cut off. I have also shown a set screw for securing it in place on the shaft. This feature is however of no essential importance.

I have shown the body of the sleeve 1 as slightly tapering whereby it has a measure of adjustment for cores of differing size. At opposite sides the sleeve is cut away forming a surface which has a greater curvature than that of the rest of the sleeve. These cut-away segments extend for a considerable distance lengthwise the sleeve, and, as herein shown, are two in number, although one, or more than two might be used. This leaves the exterior outline of the sleeve throughout the length of these segments, of an oval character. The space within the circular outline of the sleeve at other points, and the surface of these segments receive segment plates 2, which substantially complete the circle of the sleeve when in their central position. These segment plates are held so that they are free to have a limited movement peripherally, whereby they are wedged between the sleeve 1 and the interior of the roll, thus securely holding the roll against turning upon the shaft. The sleeve has a flange 3 at its outer or larger end. This flange has recesses 30 placed opposite the cut-away segments 10 adapted to receive the arm or lug 20 which extends from the corresponding end of the segment plate 2. These arms 20 extend lengthwise from the end of the plates 2 and then outward at right angles. The recesses 30 in the flange 3 are each covered by a plate or ring 4, which is cut-away as at 40 to permit peripheral movement of the segment plates upon the sleeve, and serve to hold said segment plates in place but so that they may turn somewhat about the sleeve. The plates or ring 4 is removably secured, as by screws 7.

In Fig. 4 I have shown in section, the core 5 upon which the roll of paper is formed. When the chuck or mandrel is placed within this core, it will approximately fill it. When the roll tends to turn relative to the shaft, the segment plates 2 will be caused to turn about the sleeve. This will cause these plates to wedge between the core and the sleeve 1, thereby securely holding the roll against turning. This will occur in whichever way the turning tendency may act. It is therefore not necessary to have these made right and left handed.

What I claim as my invention is:

1. An adjustable clutch for paper rolls comprising a sleeve having an exterior surface divided into segments, certain of these segments being concentric the shaft and others lying wholly within the radius of said concentric surfaces but being of a larger radius of curvature, and segment plates adapted to lie against said depressed segments without extending beyond the radius of said concentric surfaces, and means for preventing separation of sleeve and plates while permitting limited relative rotation tending to overlap said plates upon the concentric outer surfaces of the sleeve.

2. A clutch for paper rolls comprising a cylindrical sleeve having exteriorly flattened segments, plates adapted to be held upon said flattened surfaces of the sleeve, and substantially filling out the circle of the sleeve, one end of the sleeve having a flange provided with slots adapted to receive said plates to retain them in position and to permit a limited twisting action of the plates about the sleeve.

3. A clutch for paper rolls, comprising a sleeve having longitudinally extending flattened exterior segment surfaces and having a flange at one end provided with recesses in its face toward said segment surfaces, plates approximately filling out the circle of the sleeve when facing said segment surfaces, said plates having arms entering the recesses in the flange, and a retaining ring secured to said flange and holding the plates in position.

4. A clutch for paper rolls, comprising a sleeve having longitudinal exterior segments which have a flattened curvature and a flange at one end having recesses in its face corresponding in position with the flattened segments of the sleeve, segment plates adapted to lie upon the flattened segments of the sleeve and each having an arm extending from an end and then bending outward and lying within the recesses in the flange, and retaining plates covering said recesses and the arms of the plates to hold the plates in position to permit a limited movement of the plates about the sleeve.

In testimony whereof I have hereunto affixed my signature at Seattle, Washington, this 30th day of January, 1911.

DAVID HUNTER.

Witnesses:
G. A. SPENCER,
H. L. REYNOLDS.

Copies of this patent may be obtained for five cents each, by addressing the "Commissioner of Patents, Washington, D. C."